United States Patent

Munetoh et al.

[11] Patent Number: 5,923,839
[45] Date of Patent: *Jul. 13, 1999

[54] DATA STORAGE SYSTEM, DATA TRANSFER METHOD, AND DATA RECONSTRUCTION METHOD

[75] Inventors: Seiji Munetoh; Hiroki Murata; Hideto Niijima, all of Tokyo; Nobuaki Takahashi, Machida, all of Japan

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/752,862

[22] Filed: Nov. 20, 1996

[30] Foreign Application Priority Data

Dec. 6, 1995 [JP] Japan ................................ 7-317797

[51] Int. Cl.$^6$ .................................................. G06F 11/00
[52] U.S. Cl. .................................... 395/185.01; 371/40.15
[58] Field of Search ................................ 371/51.1, 40.15; 395/182.04, 182.05, 182.07, 182.08, 185.01, 441, 440, 183.18, 494, 495, 182.03, 182.09, 182.16, 183.19

[56] References Cited

U.S. PATENT DOCUMENTS

| | | | |
|---|---|---|---|
| 5,185,876 | 2/1993 | Nguyen et al. | 395/425 |
| 5,208,813 | 5/1993 | Stallmo | 371/10.1 |
| 5,226,010 | 7/1993 | Glider et al. | 365/189.04 |
| 5,388,243 | 2/1995 | Glider et al. | 395/425 |
| 5,463,643 | 10/1995 | Gaskins et al. | 371/40.1 |
| 5,469,566 | 11/1995 | Hohenstein et al. | 395/182.04 |
| 5,471,640 | 11/1995 | Mcbride | 395/842 |
| 5,499,337 | 3/1996 | Gordon | 395/182.04 |
| 5,564,116 | 10/1996 | Arai et al. | 395/182.05 |
| 5,596,708 | 1/1997 | Weber | 395/182.04 |
| 5,608,891 | 3/1997 | Mizuno et al. | 395/441 |
| 5,634,033 | 5/1997 | Stewart et al. | 395/441 |
| 5,650,969 | 7/1997 | Niijima et al. | 365/200 |
| 5,651,132 | 7/1997 | Honda et al. | 395/441 |
| 5,675,726 | 10/1997 | Hohenstein et al. | 395/182.04 |

OTHER PUBLICATIONS

H. Murata et al., "RAID Subsystem Structure Using ATA Drives", Academic Society of Electronic Data Communications Conference, Fall 1994, D–88, pp. 93. (Translation Included).

P. Chen et al., "Introduction to RAID", Computer Science Div., Department of Electrical Engineering and Computer Sciences, UC Berkeley, CA.

M. Schulze et al., "How Reliable is a RAID", Computer Science Div., Electrical Engineering and Computer Science Department, UC Berkeley, Berkeley, CA.

Serial No. 08/592,281, Munetoh et al., filed Jan. 26, 1996.

*Primary Examiner*—Robert W. Beausoliel, Jr.
*Assistant Examiner*—Nadeem Iqbac
*Attorney, Agent, or Firm*—Noreen A. Krall

[57] ABSTRACT

A data storage system is provided having a faster data transfer rate and reduced complexity though improved control of timing. The data storage system has a plurality of storage devices and a plurality of data buses through which data are transferred. An input/output unit interleaves a plurality of data between an interface and the plurality of data buses while transferring data. A first and a second latch unit, serially connected between the storage devices and the data bus, retain data.

12 Claims, 7 Drawing Sheets

DATA STORAGE SYSTEM, DATA TRANSFER METHOD, AND DATA RECONSTRUCTION METHOD

FIELD OF THE INVENTION

The present invention relates to a data storage system and a method for transferring data and, in particular, to a data storage system and a data transfer method for interleaving data during a data transfer.

BACKGROUND OF THE INVENTION

As computers handle ever increasing amounts of data, the performance and reliability of the data storage systems must be improved. Redundant Arrays of Inexpensive Disks (RAID), among other systems, satisfy the performance and reliability requirements. In a RAID system, a host computer controls multiple hard disk drives, as though the disk drives were a single hard disk. To improve reliability, RAID systems store parity data in addition to the user's data. If a disk drive fails, the parity data is used to reconstruct the data on the failed disk drive. RAID systems compute parity data using an exclusive OR (XOR) operation on the user data. If one of the disk drives fails, the data in the failed disk drive is reconstructed by XOR'ing the data stored in the remaining disks. Therefore, RAID systems are not only capable of storing large amounts of data, but are also highly reliable.

Recently, there has been a growing demand for simpler systems capable of transferring data at higher speeds. To meet this demand, a RAID system can be provided with shared data buses, e.g., a dual bus configuration. Shared data buses both reduce the number of buses and simplify the system configuration. One conventional example is described in an article entitled "Configuration of RAID Subsystem with ATA Storage Means," The Institute of Electronics, Information and Communication Engineers meeting in the Fall of 1994, D-88. The article describes a RAID subsystem having shared data buses, and also having a crossbar switch connected between each hard disk drive and each shared data bus.

FIG. 1 is a block diagram of a conventional data storage system. Four hard disk drives (HDDs) HDD0–HDD3 are connected to two data buses DD0, DD1. HDD0 and HDD1 directly connect to data buses DD0 and DD1. HDD2 and HDD3 connect to data buses DD0 and DD1 via a crossbar switch 101. The data buses DD0, DD1 and hard disk drives HDD2, HDD3 can be connected, as appropriate, via the crossbar switch 101. Control lines (not shown) connected to a data path controller (not shown) control read and write operations to each HDD. A parity generation circuit 103 generates parity and connects to the data buses DD0 and DD1. A parity buffer memory 105, also connected to the parity generation circuit 103, temporarily stores data, including parity data.

Storage systems are connected to host computers, and host computers have a central processing unit (CPU). Typically, in storage systems having rotating media, such as a hard, optical or magneto-optical disk drive, the access speed of the storage system is slower than the CPU processing speed. One reason for the speed gap is that disk drives have a slow data transfer speed. The more important reason is that disk drives can generate a wait request, e.g. from a seek operation, at any time during the data transfer. When a wait request occurs, the entire bus cycle halts until the wait request is cleared. Therefore, the data transfer speed of the data storage system is extremely slow when compared to the processing speed of the host computer. Even if a system uses solid-state memory, such as EEPROM, as the storage means, a similar problem may occur if the access speed of the storage means is slower than the processing speed of the host's CPU. Consequently, the storage system design is complicated because of timing and control needed to handle the asynchronous wait requests.

SUMMARY OF THE INVENTION

One or more of the foregoing problems are solved by the present invention.

It is one object of the present invention to provide data transfers over data buses at a higher speed.

It is another object of the present invention to reduce system complexity by simplifying the design of the control of the system timing.

In view of the foregoing objects, the present invention provides a method and system which interleaves a plurality of data sets sent by a host computer by transferring the data sets onto a plurality of data buses.

The present invention interleaves a plurality of data sets sent from a host computer when transferring the data sets onto a plurality of data buses. The term "interleaving" means time-division multiplexing of a bus cycle, and more specifically, to alternately arrange, in terms of time, a sequence of data sets such that their sequence is retained.

The present invention provides a data storage system having a plurality of storage devices and a plurality of data buses through which data are transferred. An input/output unit interleaves a plurality of data between an interface and the plurality of data buses while transferring data. A first and a second latch unit, serially connected between the storage devices and the data bus, retain data.

In a first embodiment of the present invention, a data storage system has a plurality of storage devices for storing data and synchronizes accesses to the storage devices. The data storage system also has a plurality of data buses for transferring data, an input/output unit, and a first and a second latch unit. The input/output unit interleaves a plurality of data sets while transferring the plurality of data sets onto each data bus. The latch units are serially connected between the storage devices and the data bus, and each latch unit retains (stores) the data.

Preferably, each latch unit retains data synchronously with the interleave timing. An interleave signal defines the interleave timing and controls the input/output unit Preferably, a first latch unit is controlled such that data is retained in response to a first control signal which corresponds to a change of the interleave signal. A second latch unit is controlled so as to retain the data in response to a second control signal. The timing of the second control signal differs from the timing of the first control signal and corresponds to the change of the interleave signal.

A second preferred embodiment of the present invention provides a data storage system comprising a plurality of storage devices, data buses, an input/output unit, and a selector. The selector connects a plurality of storage devices to the data busses in a combination determined by an address signal. The selectors have a first and a second latch unit. The first and second latch units are serially connected. The first latch unit retains data in response to a first control signal synchronized with an interleave signal. The second latch unit retains data in response to a second control signal. The timing of the second control signal is different from the first control signal and is synchronized with the interleave signal.

The present invention preferably further comprises a parity generator which connects to the data buses and computes parity data from input data. In addition, a parity buffer can be connected to the parity generator to store the parity data. Such a configuration is typical in RAID systems. The selector may also comprise a parity generator.

A third embodiment of the present invention provides a method for transferring data in a data storage system having a plurality of storage devices for storing data, a plurality of data buses, and a plurality of latch circuits. The plurality of latch circuits are serially connected between the disk drive and the data bus, and are used to interleave a plurality of data sets. The plurality of data sets are transferred onto each data bus during a plurality of transfer phases. The data transfer method transfers one interleaved data set onto each data bus during a first transfer phase, and retains the transferred data set in a latch circuit in the fore stage. During a second transfer phase, another interleaved data set is transferred onto each data bus in a second transfer phase and retained in the latch circuit in the after stage, while transferring the data set retained in the latch circuit at the fore stage to the latch circuit at the after stage. The latches at the fore and after stages are serially connected. The data set from the fore state is retained in the latch circuit at the after stage and transferred to each disk drive with a predetermined timing.

DETAILED DESCRIPTION OF THE INVENTION

Figure 1:
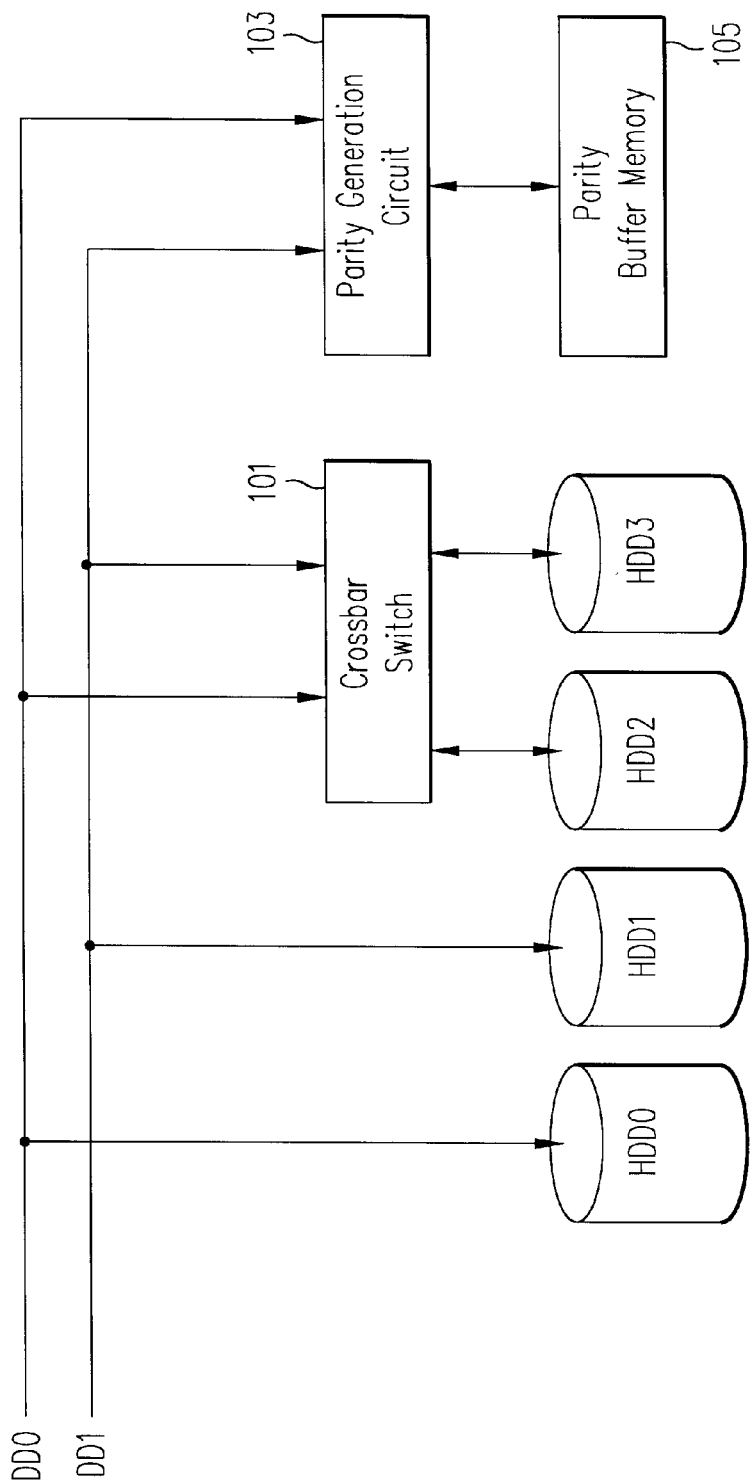
FIG. 1 is a block diagram of a conventional data storage system.
Figure 2:
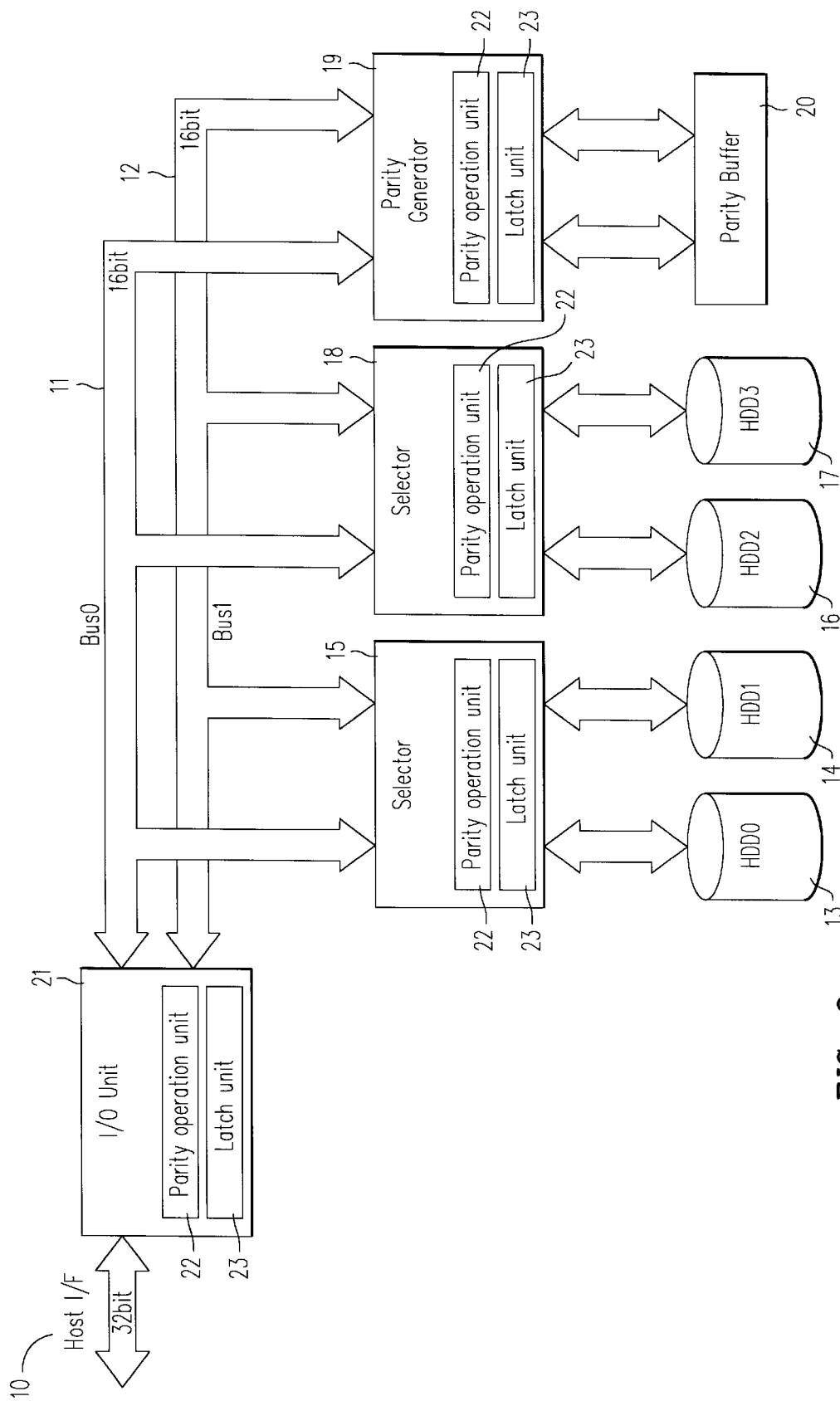
FIG. 2 is a block diagram of a data storage system of the present invention.

FIG. 2 is a block diagram of a data storage system in a first embodiment of the present invention. The present invention interleaves a plurality of data sets sent from a host computer by transferring the data sets from a host interface (I/F) 10 of the storage system to a plurality of data buses 11, 12. "Interleaving" means time-division multiplexing a bus cycle, and more specifically, means alternately arranging a sequence of data sets such that their sequence is retained. A plurality of latch units 23 are serially connected between the host I/F 10 and a storage devices. Preferably the storage devices or storage means are a set of hard disk drives 13, 14, 16, 17. However, the storage devices can be any solid-state memory such as EEPROM or any storage device having rotatable storage media, such as a hard, optical or magneto-optical disk drive. Although the first embodiment of FIG. 2 describes an exemplary storage system having four hard disk drives connected to two shared buses, the invention is not meant to be limited to such systems. The present invention also applies to more complex systems having five or more storage devices, such as HDDs, connected to three or more busses.

A selector 15 is provided between two 16-bit shared data buses 11, 12, and the storage means, e.g. HDDs 13, 14. Similarly, another selector 18 is provided between the data buses 11, 12 and hard disk drives 16, 17. The selectors 15, 18 connect the data buses 11, 12 to the HDDs 16, 17, in any combination according to an address signal. The selectors 15, 18 have a parity operation unit 22 and a latch unit 23. In response to an operation control signal, the parity operation unit 22 computes parity data by performing an XOR operation on the data specified by the address signal, i.e., data from the hard disk drive or data from the data bus.

The latch units 23 close the timing gap between the host I/F 10 and the storage system and are used to transfer the interleaved data between the data bus and the storage devices. A latch unit 23 comprises a plurality of latch circuits which can be serially connected, and is controlled by a latch control signal. The latch circuits are serially connected at more than one stage. Each latch circuit temporarily stores data and the latch control signal supplies timing. The address signal determines which data is temporarily stored. For example, depending on the address signal, latch unit 23 may store data from the HDD or data from the data bus. In addition, latch unit 23 can store parity data.

A parity generator 19 connects to the data buses 11, 12 and comprises a parity operation unit 22 and a latch unit 23. The parity generator 19 generates parity data corresponding to the input data. The parity generator 19 also connects to a parity buffer 20. The parity buffer 20 is a memory for storing parity data from the parity generator 19. The parity generator 19 and the parity buffer 20 are optional for the storage system. Generally, the parity generator 19 and the parity buffer 20 are not used in simple disk array systems which do not have a function for reconstructing data if a disk drive fails and are not necessary for the invention.

One end of the input/output unit 21 connects to the shared data buses 11, 12, and another end of the input/output unit 21 connects to the host I/F, a 32-bit data bus. The input/output unit 21 also has a parity operation unit 22 and a latch unit 23. The input/output unit 21 is responsive to a change of an interleave signal. In addition, the latch control signals are synchronized with the interleave signal.

Figure 3:
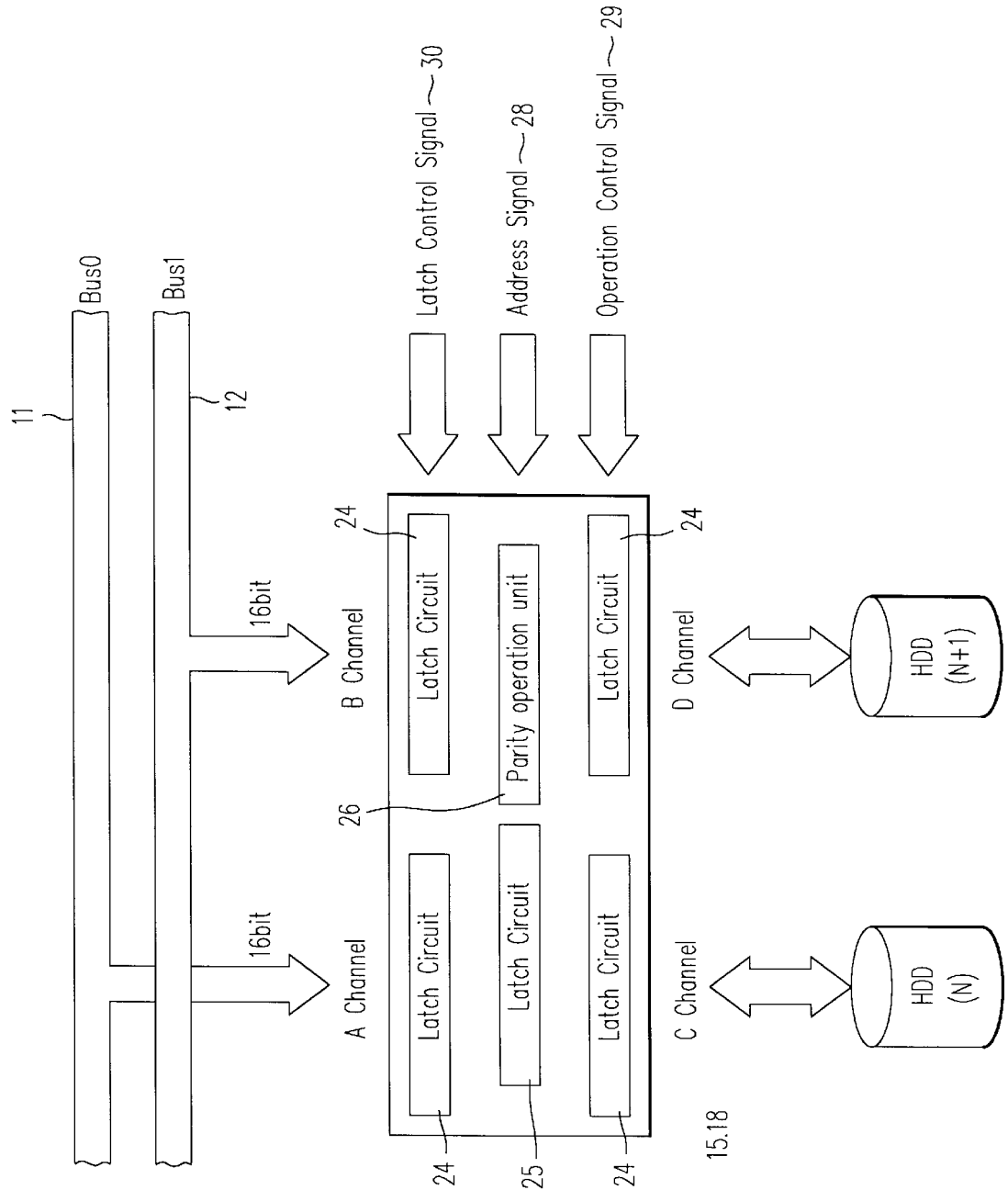
FIG. 3 is a block diagram of a selector of the present invention.

FIG. 3 is a block diagram of the selector 15, 18 of preferred embodiment of the present invention. The selector may be implemented as a crossbar switch having four I/O channels A, B, C, and D. Each I/O channel is a 16-bit (2 byte) channel. The 4-channel crossbar switch connects the channels A, B, C, D according to an address signal 28. Consequently, any hard disk drive, HDD(N), HDD(N+1), can be connected to either data bus 11, 12. Also, data can be transferred directly between a pair of disk drives HDD(N), HDD(N+1) through the crossbar switch without going through data bus0 11 and bus1 12.

The parity operation circuit 26 computes parity data which is the exclusive OR of data on the specified channels of the crossbar switch (CBS). An operation control signal 29 controls the parity operation unit 26. When the operation control signal 29 is in a predetermined state, the parity operation unit computes the XOR of the data on the channels. Four latch circuits 24 and a latch circuit 25 temporarily store data on a given channel of the crossbar switch or store parity data computed by the parity operation circuit 26. Each latch circuit 24 is connected to each I/O channel A, B, C, D. The latch circuit 25 is selectively connected to one of the four latch circuits 24 to form a serial connection. This configuration will be described below. Latch control signals 30 control the latch circuits 24 with different timing. When a latch control signal 30 is in a predetermined state, data is temporarily stored in the latch circuit.

Although FIG. 3 depicts channel A connecting to Bus 0, channel B connecting to Bus 1, channel C connecting to HDD(N), and channel D connecting to HDD(N+1), in practice, any channel of the crossbar switches 15, 18 can be connected to any bus or HDD.

In addition, the crossbar switch of FIG. 3 can similarly be used to implement the parity generator 19 and the input/output unit 21 (FIG. 2). As a parity generator 19, two channels of the crossbar switch 19 connect to the parity buffer 20, instead of connecting to disk drives. As an input/output unit 21, two channels of the crossbar switch 21 connect to the host I/F 32-bit data bus, while the other two channels connect to Bus 0 and Bus 1.

In the following description, the selectors 15, 18, the parity generator 19, and the input/output unit 21 are implemented using a crossbar switch having the same circuit configuration. However, the invention is not meant to be limited to a particular circuit configuration. It is to be understood that the selectors, parity generators, and input/output unit can be implemented using different circuit configurations.

The operation of a data storage system which has a configuration as shown in FIGS. 2 and 3 will now be described with reference to FIG. 4. In the present invention, the interleaving has two phases and two stages. In a first phase, data transferred onto the data bus is retained in a latch circuit in a fore stage. Subsequently, in a second phase, the data retained in the latch circuit in the fore stage is transferred to and retained in a latch circuit in the after stage. During the second phase, new data is transferred from the data bus to unused latch circuits in the after stage and retained. When data from a series of phases are retained in the latch circuits in the after stage, the retained data sets are collectively transferred from the after stage to the storage devices synchronous with the access cycle of the storage devices.

Preferably, the latch units retain data synchronously with the interleave operation. An interleave signal controls the input/output unit and defines the interleave timing. The latch circuits in the fore stage retain data in response to a first latch control signal which is synchronized to a change of the interleave signal. The latch circuits in the after stage also retain data in response to a second latch control signal which is also synchronized to the change of the interleave signal. The timing of the first latch control signal is different from the timing of the second latch control signal.

A synchronized write operation of the preferred embodiment of the present invention will be discussed with reference to FIG. 4. The crossbar switches 15 and 18 serially connect latch circuits 31 and 32 to latch circuits 33 and 34 respectively. One cycle comprises two phases: Phase A and Phase B. Two data sets D1, D2 from the Host I/F 10 are transferred in one cycle. A crossbar switch CBSH 21 is the input/output unit and connects to the host I/F 10. First, in Phase A, the host I/F 21 transfers a 32-bit-wide data set D1 to the storage system. The input/output unit, CBSH 21, divides the data set D1 into two 16-bit data sets d1, d2 and then transfers d1 and d2 onto the 16-bit data buses 11, 12. By providing an address signal and a control signal at a predetermined level to crossbar switch CBS0 15, the data set d1 on the data bus 11 is retained in a latch circuit 31 in a fore stage 301. At the same time, by providing an address signal and a control signal at a predetermined level to a crossbar switch CBS1 18, the data set d2 on data bus 12 is retained in a latch circuit 32 in the fore stage 301.

After Phase A, in Phase B, another 32-bit-wide data set D2 is transferred from the Host I/F 10. Crossbar switch CBSH divides data set D2 into two 16-bit data sets, d3 and d4, and transfers data sets d3 and d4 onto the 16-bit data buses 11, 12. Data set d3 on data bus 11 is retained in a latch circuit 34 in an after stage 302 by providing an address signal and a control signal at a different level to the crossbar switch CBS0 15. At the same time, data set d4 on the data bus 12 is retained in a latch circuit 36 in the after stage 302 by providing an address signal and a control signal at a different level to the crossbar switch CBS1 18. Data set d1, stored in the latch circuit 31 in the fore stage 301, is also transferred to and retained in a latch circuit 33 in the after stage 302. In addition, data set d2 stored in latch circuit 32 in the fore stage 301 is transferred to and retained in a latch circuit 35 in the after stage 302 which is serially connected.

The latch circuits 33, 34, 35, 36 connect to disk drives HDD0, HDD1, HDD2, HDD3, 13, 14, 16, 17 respectively. In the after stage 302, the retained data sets d1, d3, d2, d4 are written to the disk drives HDD0, HDD1, HDD2, HDD3, 13, 14, 16, 17, respectfully, with a predetermined timing.

The present invention provides serially connected latch circuits between data buses and data storage devices. The data sets D1, D2 from the host interface are transferred in different phases, temporarily stored in latch circuits, and then collectively transferred to each disk drive. Therefore, even if a wait request from a drive occurs, the system is not complicated because data transfers are managed collectively.

In the present invention, the host I/F 10 is twice as wide as the disk drive interface 305. In addition, because one cycle has two transfer phases, the data sets are interleaved and transferred twice as fast as systems having a single phase cycle. Therefore, as viewed from the host, the present invention can write data at a speed four times faster than speed of the drive interface. In reality, for continuous access, the disk drive write speed is controlled by the transfer (read/write) speed of the media. However, in theory, for example, a system having eight drives can achieve a transfer speed eight times faster than the transfer speed of media. Therefore, if the media transfer speed of the drives is 5 MB/sec, continuous data transfers to the host at a rate of 40 MB/sec can be achieved. Therefore, a significantly faster system can be configured easily.

A read operation is accomplished by performing the steps described above for the write operation in reverse order and therefore will not be described in further detail.

Figure 5:
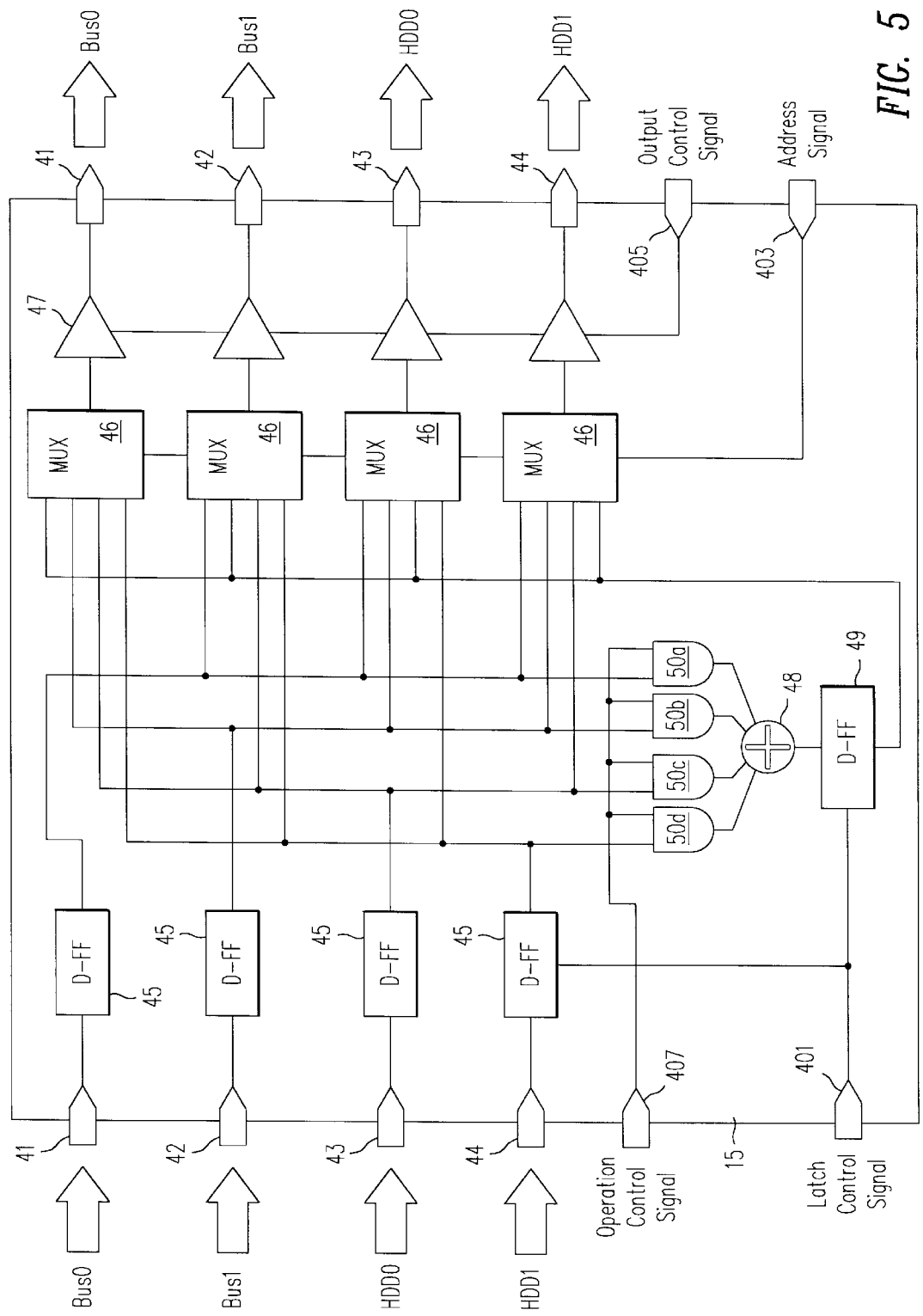
FIG. 5 is a block diagram of a crossbar switch.

The crossbar switch 15 of the present invention could have many configurations. FIG. 5 is a diagram showing a preferred embodiment of the crossbar switch 15. In FIG. 5, for clarity, the input/output ports of the data buses are depicted separately. The crossbar switch 15 has I/O channels 41, 42, 43, 44 and connects to data buses 11, 12 and to hard disk drives 13, 14. Each I/O channel is 16-bits wide and corresponds to the width of the data bus. The latch circuits are implemented by flip-flop circuits 45. Each I/O channel 41–44 is connected to the input of one of the four flip-flop circuits 45. The flip-flop circuits 45 are individually controlled by a latch control signal 401. The output of each of the four flip-flop circuits 45 is connected to the input of three multiplexers 46 other than the multiplexer associated with its own I/O channel. The output of an XOR circuit 48, described below, is input to all the multiplexers 46.

Each multiplexer 46 is controlled by a 2-bit address signal 403. One of the four multiplexers 46 input is selected using a predetermined address signal, and the selected input data is transferred to the output of the multiplexer 46. For example, for the top multiplexer 46, either one of the data from I/O channels 42 to 44 or the output data from the XOR circuit 48, is transferred to the I/O channel 41 depending on the predetermined address signal. The output of each multiplexer 46 connects to the I/O channels 41 to 44 via an output driver 47 which is controlled by an output control signal 405.

The output of each flip-flop circuit 45 also connects to the input of the XOR circuit 48. An operation control signal 407 controls the XOR circuit 48. When the operation control signal 407 is a predetermined level, the XOR circuit 48 is activated to perform an XOR operation. The output of the XOR circuit 48 is connected to the input of a flip-flop circuit 49 which acts as a latch circuit in the after stage. The latch control signal 401 controls the flip-flop circuit 49 to retain data, with different timing from that for retaining data in flip-flop circuits 45 in the fore stage.

AND gates 50a to 50d, which act as enable means, are provided between the four flip-flop circuits 45 and the XOR circuit 48. An enable signal controls the enable means. The operation control signal 407 is the enable signal.

Referring back to FIG. 2, in the crossbar switch 15, the four flip-flop circuits 45 and the flip-flop circuit 49 correspond to the latch unit 23 and the XOR circuit 48 corresponds to the parity operation unit 22. The flip-flop circuits 45 in the input part and the flip-flop circuit 49 in the XOR output part are serially connected and are respectively associated with the latch circuits in the fore and after stages.

The latch units are serially connected in two stages. For example, to form the 2-stage configuration serially connecting flip-flop circuits 45 of I/O channel 41 to the flip-flop circuit 49, an operation control signal 407 or enable signal having a level "1" is provided to the AND gate 50a so that the output data from a flip-flop circuit 45 associated with the I/O channel 41 becomes the input to the XOR gate 48. At the same time, an enable signal having level "0" is provided to the other AND gates 50b to 50d. Therefore, the outputs from the AND gates 50b to 50d are a level "0", regardless of their corresponding input data. Since all the inputs to the XOR circuit 48 are "0" except for the output data from the flip-flop circuit 45 associated with I/O channel 41, the XOR circuit 48 acts like a driver. Hence, the 2-stage configuration serially connecting flip-flop circuits 45 and 49 via a driver is implemented. A similar configuration can be implemented for I/O channels 42–44 by providing an appropriate combination of Operation Control Signals 407 or enable signals.

Figure 4:
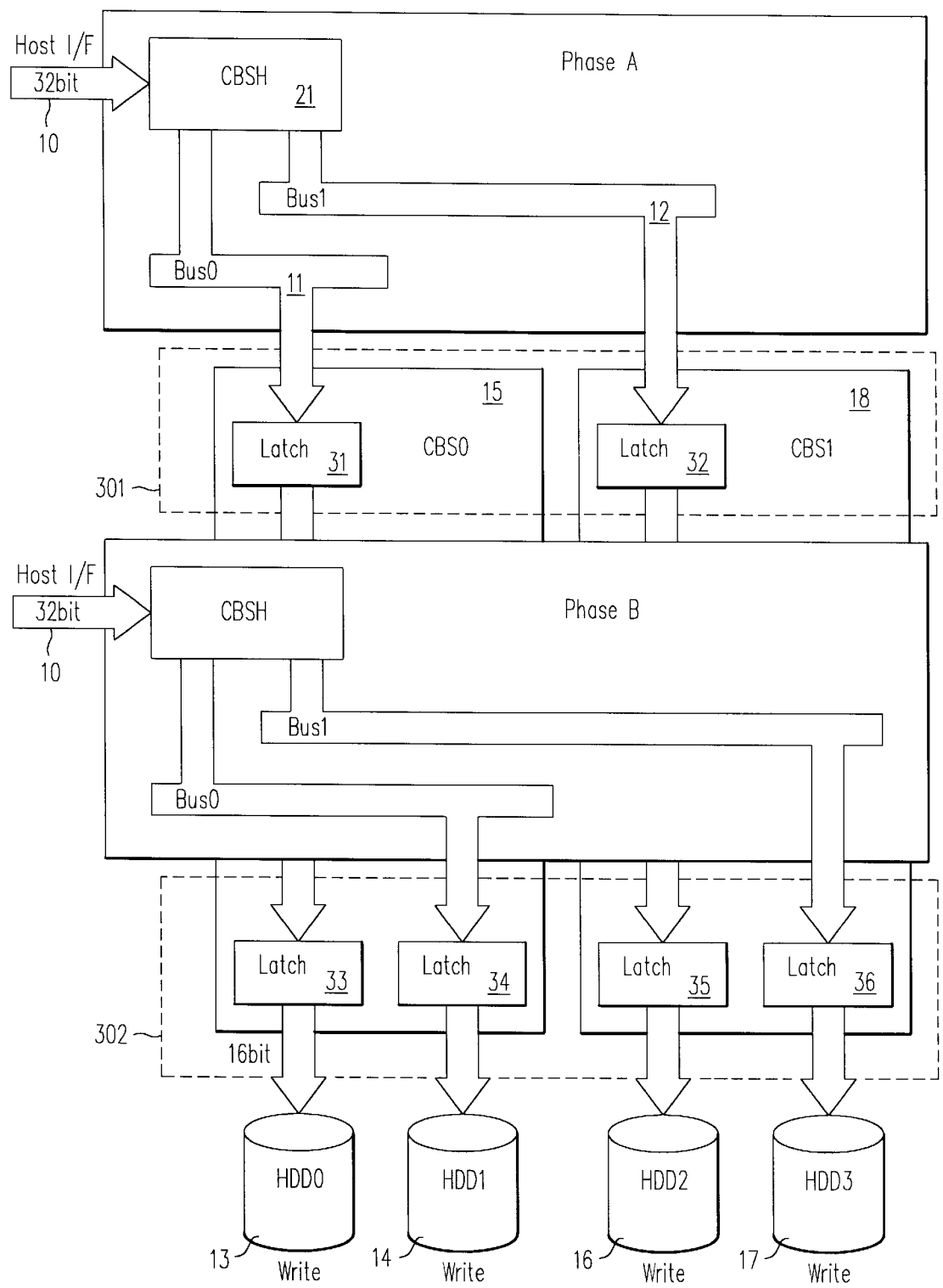
FIG. 4 is a conceptual diagram showing a synchronous write operation in the data storage system of the present invention.

Once the latch units are serially connected in two stages, the write operation of FIG. 4 can be simply and easily accomplished by controlling the crossbar switch 15 using an address signal 403, a latch control signal 401, operation control signal 407, and output control signal 405 with appropriate timing. Further details are known to those skilled in the art and will not be described further.

Referring back to FIG. 2, the operation of the selector 18 is similarly accomplished using a crossbar switch and changing only the destination to which the I/O channels are connected. In addition, the I/O unit 21 and the parity generator 19 can be similarly implemented.

Figure 6:
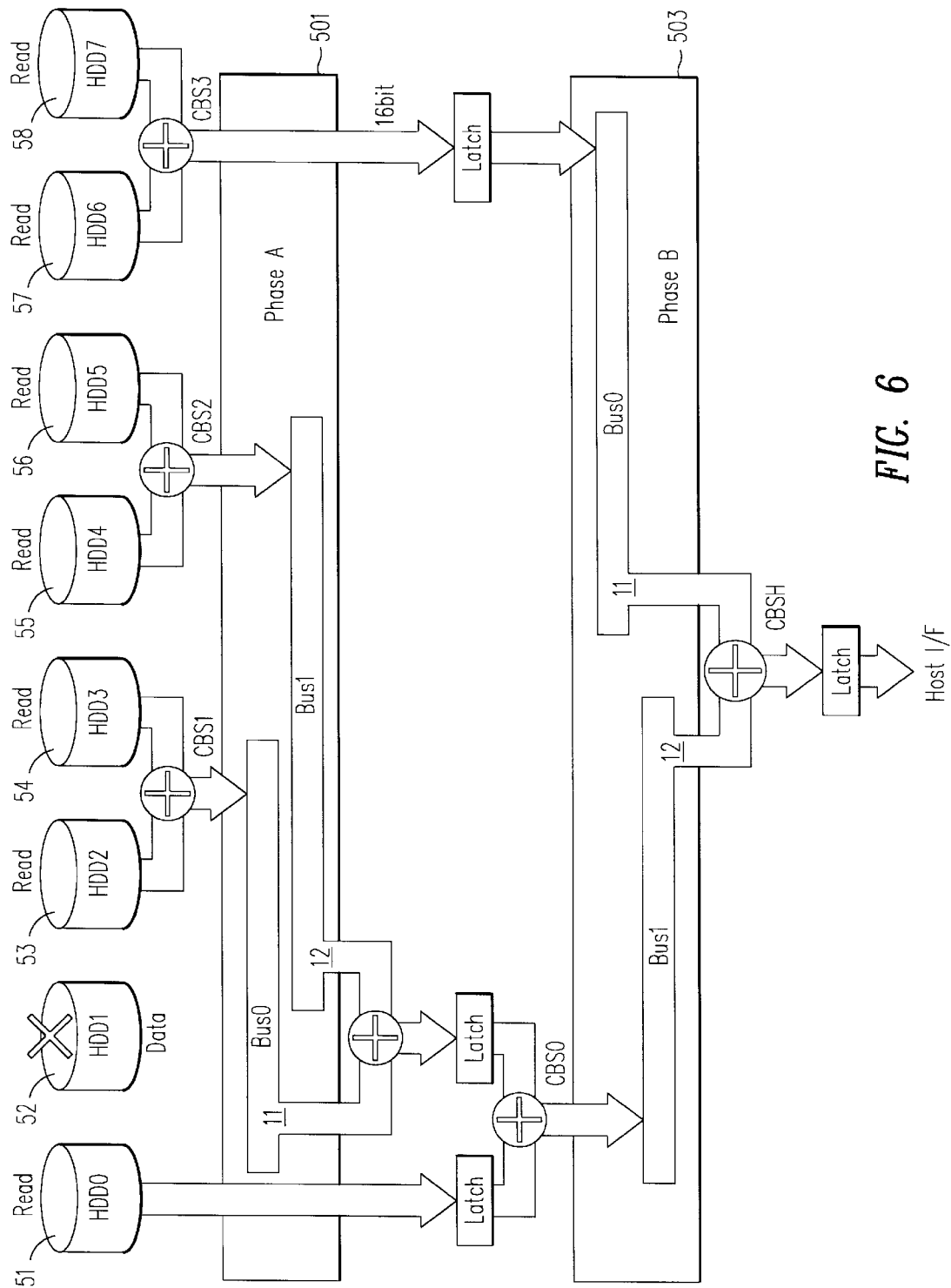
FIG. 6 is a conceptual diagram showing a data read operation when a disk fails.

FIG. 6 is a conceptual diagram of a data read operation in a RAID 5 system in which a disk drive failed. The block diagram of FIG. 6 is similar to FIG. 2, except that the number of hard disk drives is increased from four to eight, and hard disk drives 51 and 52 are connected to a crossbar switch CBS0. FIG. 6 does not show the connection between drive 52 and CBS0. Similarly, drives 53 and 54 are connected to a crossbar switch CBS1, drives 55 and 56 are connected to a crossbar switch CBS2, and drives 57 and 58 are connected to a crossbar switch CBS3. In addition, another crossbar switch CBSH is the I/O unit which connects the host interface and data buses 11, 12.

The following description of FIG. 6 will be made with reference to the reference numbers in FIG. 5. In FIG. 6, the storage system has eight drives 51–58 storing data sets d1–d8 respectively. Drive 52 is a failed hard disk drive storing data set d2 (marked with an "X") and is connected to CBS0.

First, in transfer phase A, in the crossbar switch CBS1, data set p1 is obtained by computing the XOR of data sets d3, d4 stored in the hard disk drives 53, 54. In the crossbar switch CBS2, data set p2 is obtained by computing the XOR of data sets d5, d6 stored in the hard disk drives 55, 56. The obtained data sets p1, p2 are transferred onto the data buses 11, 12, respectively.

In the crossbar switch CBS0, which is connected to the failed hard disk drive 52, data set d1, from hard disk drive 51, is retained in the flip-flop circuit 45 which is connected to I/O channel 43. At the same time, the two data sets p1, p2 are transferred onto the data buses 11, 12 and input to the I/O channels 41, 42, respectively. The data sets p1, p2 are supplied to the input of the XOR circuit 48, because a level "1" enable signal is supplied to the AND gates 50a, 50b. Because an enable signal having level "0" is supplied to the AND gates 50c, 50d, the outputs from AND gates 50c, 50d are a level "0" signal. Therefore, only the data sets p1, p2 from the data buses 11, 12 are input to the XOR circuit 48.

The XOR circuit 48 computes a data set p3 by calculating the XOR of the data sets p1 and p2. The resulting data set p3 is output to the I/O channel 44 by controlling the circuit means (multiplexer) 46 using the address signal 403, and is supplied to the flip-flop 45 connecting to the I/O channel 44. The data set p3 is retained in the flip-flop circuit 45, connecting to the I/O channel 44, by controlling the latch control signal 401 with appropriate timing. That is, while data set d1 from the hard disk drive 51 is retained in the flip-flop circuit 45 associated with the I/O channel 43, the data set p3, which is the XOR of the data stored in the other hard disk drives 53 to 56 connected to a plurality of selectors, is retained in the I/O channel 44 connected to the failed hard disk drive 52.

In addition, a data set p4 is obtained by computing the XOR of data sets d7, d8 stored in the hard disk drives 57, 58 connected to CSB3. In transfer phase A, the data set p4 is retained in the flip-flop circuit 49, connected to the output of the XOR circuit 48, in the crossbar switch CBS3 and is not transferred to the data bus.

Following transfer phase A, in transfer phase B, initially a data set p5 is obtained in the XOR circuit 48 of crossbar switch CBS0 by computing the XOR of the data sets d1, p3 retained in the flip-flop 45 connected to I/O channels 43, 44 of the crossbar switch CBS0, respectively. The data set p5 is transferred to the data bus 12. At the same time, the data set p4 stored in the flip-flop 49 in the crossbar switch CBS3 is transferred to the data bus 11. Then, the XOR of the two data sets p4, p5 is computed in the I/O unit CBSH. The resulting parity data set P is identical to the data set d2 which is stored in the failed hard disk drive 52. Therefore, the data set which was lost due to a failure of a hard disk drive is reconstructed by computing the XOR of the data stored in other hard disk drives; and the reconstructed data set P is output to the host.

In summary, data stored in a faulty hard disk drive is quickly and effectively reconstructed using the flip-flop circuit 45 associated with the faulty hard disk drive.

Figure 7:
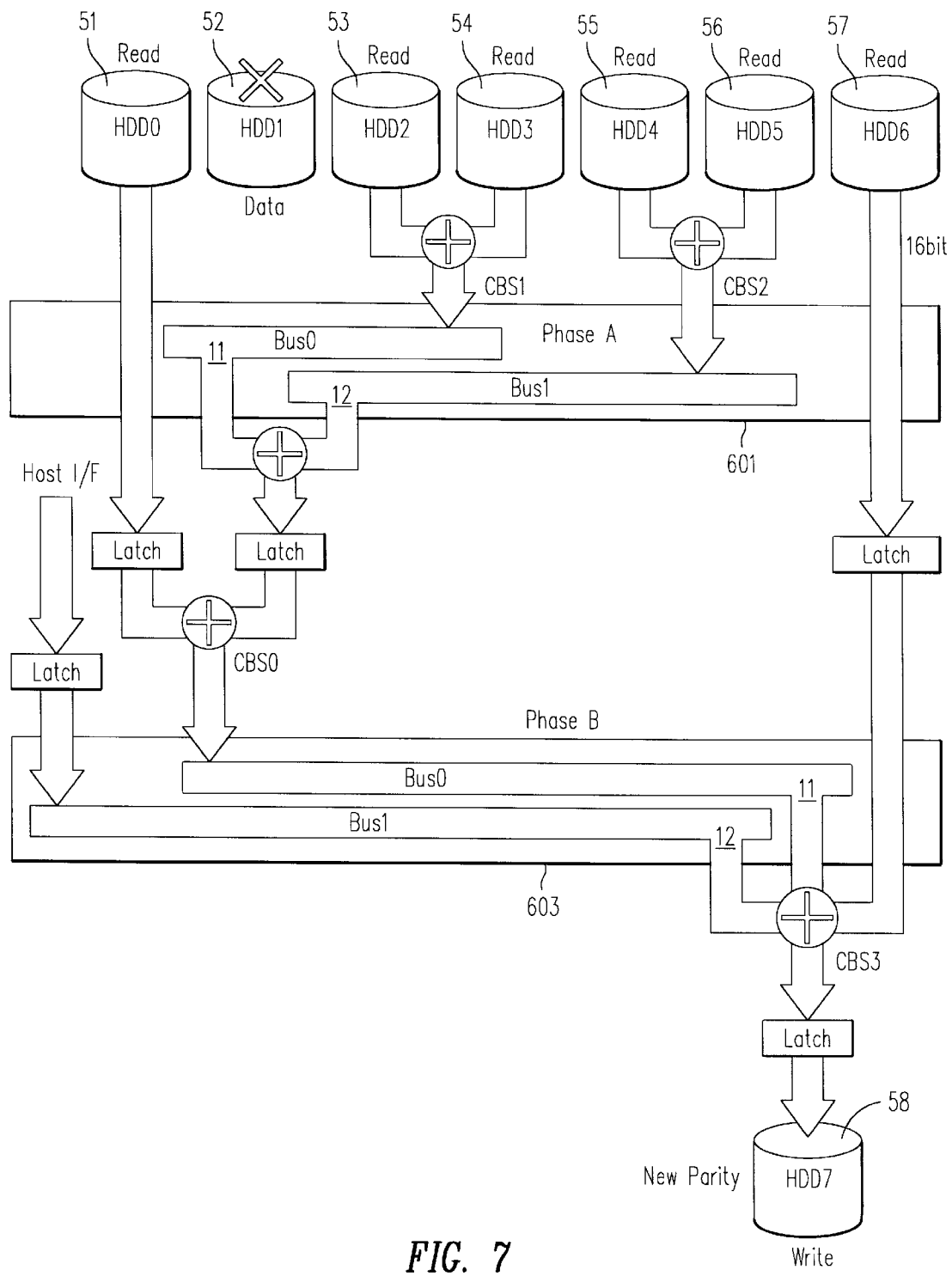
FIG. 7 is a conceptual diagram showing a parity data update operation when a disk fails.

FIG. 7 is a conceptual diagram showing the manner in which parity data is updated in a RAID 5 system when a disk drive fails. In a RAID 5 system, if one hard disk drive fails and if the system receives a write request to the faulty drive from the host, then the parity data can be updated in a manner similar to the read operation. In FIG. 7, the storage system has eight hard disk drives 51–58. Hard disk drive 52 is the faulty drive (marked with an "X") and hard disk drive 58 is the drive storing parity data.

Basically, the write operation of FIG. 7 is similar to the read operation of FIG. 6 when a disk drive fails. Therefore, only the differences will now be described. In transfer phase B, a data set is transferred from the crossbar switch CBS0 onto the data bus 11. At the same time, the data set, which was to be written to the faulty disk, is transferred onto the data bus 12. In the crossbar switch CBS3, the XOR is computed based on three data sets: two data sets transferred onto the data buses 11, 12, and one data set retained in the flip-flop circuit 45 associated with the I/O channel 44 in the transfer phase A. The resulting parity data is used to update the data stored in the hard disk drive 58. Therefore, the stored parity data is replaced with the new parity data.

For actual data transfer, various implementations are possible depending on which hard disk drive is faulty or on various combinations of a faulty disk and a parity disk. However, in any combination, efficient data transfers can be performed by effectively using latch units to temporarily store intermediate data while computing the ultimate parity data.

The present invention interleaves and transfers data in a plurality of transfer phases using latch units as temporary storage. The data is transferred and temporarily stored in latch units at a fore stage of a transfer phase. Subsequently, the data from the fore stage is transferred to latch units in an after stage together with data transferred onto the data bus in the subsequent transfer phase. The data are collectively transferred from the after stage to a storage device. In that way, data transfer is quickly transferred over the data buses. In addition, the system's timing control is simplified because a data transfer can be temporarily halted at any time when the operation of the system stops due to a wait request.

We claim:

1. A data storage system having a plurality of storage devices, comprising:

a plurality of data buses through which data are transferred;

an input/output unit interleaving a plurality of sets of data on each of the data buses while transferring said data sets between an interface and the data buses; and a plurality of selectors, each selector comprising a plurality of latch units, serially connected between the storage devices and the data buses, for retaining data synchronously with an interleave timing signal;

the input/output unit transfers the data in response to the interleave signal, a first latch unit stores data in response to a first latch control signal synchronized with the interleave signal, and a second latch unit stores data in response to a second latch control signal synchronized with the interleave signal, the second latch control signal having a different timing from the first latch control signal.

2. The data storage system as recited in claim 1 wherein the input/output unit transfers the data during a predetermined transfer phase, a first set of latch units retains the data synchronously during the predetermined transfer phase of the input/output unit, and the plurality of storage devices are a plurality of hard disk drives.

3. The data storage system as set forth in claim 1, wherein each of the selectors is responsive to an address signal for selectively connecting the storage devices and the data buses.

4. The data storage system as set forth in claim 1, wherein each of the selectors further comprises a parity generator computing parity data for the data input to the selector.

5. The data storage system as set forth in claim 4, further comprising:

a parity buffer, connected to the parity generator, for storing parity data generated by the parity generator.

6. The data storage system as set forth in claim 1, further comprising:

a control system for controlling the latch units, wherein during a first phase, data interleaved and transferred onto the data bus is retained in a first latch unit, and during a second phase following the first phase, the data retained in the first latch unit is transferred to and retained in a second latch unit, and at the same time, new data interleaved and transferred onto the data bus is retained in a third latch unit.

7. A data storage system, comprising:

a plurality of storage devices for storing data;

a plurality of data buses through which data is transferred;

a crossbar switch for transferring a first data set from an interface to the data buses during a first phase, and also for transferring a second data set from the interface to the data buses during a second phase; and a plurality of selectors, each having a plurality of channels, each channel being connected to one of the storage devices or one of the data buses, each selector being responsive to an address signal for selectively connecting the plurality of storage devices and the data buses, each selector comprising;

a first latch unit;

a second serially connected latch unit, the first latch unit retaining data synchronously with an interleave timing signal in response to a first latch control signal during the first phase, the second latch unit retaining data in response to a second latch control signal during the second phase, the second latch control signal having different timing from the first latch control signal;

a third latch unit for retaining data from each channel;

a parity operation unit for performing a logic operation using data from the first and the third latch units;

a fourth latch unit serially connected to the parity operation unit for retaining data from the parity operation unit during the second phase; and circuit means, coupled to each of the first, second, third and fourth latch units for outputting data to a selected channel in response to an address signal.

8. A method for transferring data in a storage system having an interface to a computer system, a plurality of data buses interconnected to a plurality of storage devices using a plurality of latch units, comprising the steps of:

(a) transferring a first interleaved data set from the interface onto the plurality of data buses during a first transfer phase defined by a interleave timing signal;

(b) retaining the transferred first interleaved data set in a plurality of fore stage latch units;

(c) transferring a second interleaved data set from the interface onto a plurality of data buses during a second transfer phase defined by a change in the interleave timing signal;

(d) while retaining the second interleaved data set in a plurality of after stage latch units, transferring the retained first interleaved data set from the plurality of fore stage latch units to an other plurality of after stage latch units and retaining the first interleaved data set in the other plurality of after stage latch units, wherein the other plurality of after stage latch units are serially connected to the plurality of fore stage latch units; and (e) transferring the data sets retained in the plurality of after stage latch units to the plurality of storage devices.

9. The method as set forth in claim 8, further comprising the step of:

computing a parity data set from the first and second interleaved data sets.

10. In a data storage system having a plurality of data storage devices, a selector having a plurality of input/output channels, each of the input/output channels being connected to one of a plurality of data buses or one of the data storage devices, the selector comprising a plurality of latch circuits connected to the input/output channels and a parity operation circuit for computing parity data of data on the input/output channel, a method for reconstructing data for a failed storage device comprising the steps of:

(a) interleaving and transferring data between a subset of the plurality of storage devices which are not faulty and the plurality of data buses during a plurality of transfer phases defined by an interleave timing signal;

(b) computing parity data using the parity operation circuit based on data on the plurality of input/output channels to which the plurality of data buses are connected; and (c) retaining the parity data in a latch circuit associated with an input/output channel connected to the failed storage device.

11. The method as set forth in claim 10, further comprising the steps of:

(d) computing parity data of data retained in one of the latch circuits and retained in another of the latch circuits in the parity operation circuit; and (e) transferring the parity data onto one of the plurality of data buses.

12. The method as set forth in claim 10, further comprising the steps of:

(f) performing said steps (a), (b) and (c) during a first transfer phase; and (g) performing said steps (d) and (e) during a second transfer phase.

* * * * *